United States Patent
Meguriya et al.

[11] Patent Number: 5,981,610
[45] Date of Patent: Nov. 9, 1999

[54] INJECTION MOLDING SILICONE RUBBER COMPOSITIONS

[75] Inventors: Noriyuki Meguriya; Shinichi Ide; Takeo Yoshida, all of Usui-gun, Japan

[73] Assignee: Shin-Etsu Chemical Co. Ltd., Japan

[21] Appl. No.: 09/192,235

[22] Filed: Nov. 16, 1998

[30] Foreign Application Priority Data

Nov. 17, 1997 [JP] Japan ..................... 9-332503

[51] Int. Cl.$^6$ ....................... C08J 9/32
[52] U.S. Cl. .............. 521/54; 521/55; 521/154; 523/218; 523/219
[58] Field of Search ............. 521/154, 54, 55; 523/218, 219

[56] References Cited

U.S. PATENT DOCUMENTS

| | | | |
|---|---|---|---|
| 4,433,069 | 2/1984 | Harper | 521/154 |
| 4,738,988 | 4/1988 | Dietlein | 54/154 |
| 5,209,080 | 5/1993 | Zinsmeyer . | |
| 5,246,973 | 9/1993 | Nakamura et al. . | |
| 5,391,336 | 2/1995 | Akitomo et al. | 264/50 |
| 5,750,581 | 5/1998 | Brennenstuhl et al. | 521/154 |

FOREIGN PATENT DOCUMENTS

| | | |
|---|---|---|
| 5-209080 | 8/1993 | Japan . |
| 6-200066 | 7/1994 | Japan . |
| 9-157434 | 6/1997 | Japan . |

*Primary Examiner*—Morton Foelak
*Attorney, Agent, or Firm*—Millen, White, Zelano & Branigan, P.C.

[57] ABSTRACT

A thixotropic agent is blended in a silicone rubber composition comprising an alkenyl radical-containing organopolysiloxane, an organohydrogenpolysiloxane, an addition reaction catalyst, and filler balloons having a specific gravity of 0.01–0.40 and a mean particle size of 1–300 $\mu$m. The resulting composition effectively restrains floating and separation of the filler, remains stable and is thus suitable for injection molding.

17 Claims, No Drawings

INJECTION MOLDING SILICONE RUBBER COMPOSITIONS

BACKGROUND OF THE INVENTION

1. Field of the Invention

This invention relates to thixotropic silicone rubber compositions for injection molding.

2. Background Art

As compared with metals and plastics, rubber materials generally have good shock absorbing characteristics. Among others, silicone rubber finds a wider variety of applications because of its heat resistance, weather resistance and electrical insulation. However, rubber materials, which absorb impact energy mainly by viscoelastic strains, must have a certain thickness in the impact force direction and hence, a certain weight. Since weight reduction is the trend in various fields including transportation vehicles, business machines and household appliances, there is a demand for a material which provides sufficient elasticity despite light weight and allows a number of parts to be molded.

One effective method for reducing the weight of rubber material is to admix a fine hollow filler with silicone rubber. Although a substantial weight reduction is achieved, there often occurs a separation phenomenon that the hollow filler becomes afloat in a short time due to the light weight of the hollow filler and hence, the substantial difference in specific gravity between the rubber base and the hollow filler. Particularly in an injection molding system of continuously performing molding after loading of the molding material, a series of molded parts vary in specific gravity due to the phenomenon of filler balloons separating with time. The cured rubber parts have differing weights.

There is a desire to have an injection molding silicone rubber composition loaded with a hollow filler which remains stable while preventing separation of the filler balloons.

SUMMARY OF THE INVENTION

The invention is directed to a silicone rubber composition of the addition reaction curing type comprising an alkenyl radical-containing organopolysiloxane, an organohydrogenpolysiloxane, an addition reaction catalyst, and a fine hollow filler (i.e., micro balloon). We have found that by blending in the composition a thixotropic agent for imparting thixotropy, especially a thixotropy corresponding to a sag of up to 1.2 inches after 1 minute as measured by the Boeing flow jig test, there is obtained an injection molding silicone rubber composition which effectively restrains floating and separation of the hollow filler and thus remains stable over a long term.

Accordingly, the present invention provides a thixotropic silicone rubber composition for injection molding, comprising (A) 100 parts by weight of an organopolysiloxane having on the average at least two alkenyl radicals in a molecule, represented by the following average compositional formula (1):

$$R^1_a SiO_{(4-a)/2} \quad (1)$$

wherein $R^1$ is a substituted or unsubstituted monovalent hydrocarbon radical having 1 to 10 carbon atoms, and letter a is a positive number of 1.5 to 2.8, (B) 0.1 to 50 parts by weight of an organohydrogenpolysiloxane represented by the following average compositional formula (2) and having at least two hydrogen atoms each attached to a silicon atom:

$$R^2_b H_c SiO_{(4-b-c)/2} \quad (2)$$

wherein $R^2$ is a substituted or unsubstituted monovalent hydrocarbon radical having 1 to 10 carbon atoms, and letter b is a positive number of 0.7 to 2.1, c is a positive number of 0.001 to 1.0, and the sum of b+c is from 0.8 to 3.0, (C) 0.01 to 30 parts by weight of a thixotropic agent, (D) a catalytic amount of an addition reaction catalyst, and (E) 0.5 to 30 parts by weight of a fine hollow filler (i.e., a micro balloon) having a specific gravity of 0.01 to 0.40 and a mean particle size of up to 300 μm.

DETAILED DESCRIPTION OF THE INVENTION

Component (A) of the injection molding silicone rubber composition according to the invention is an organopolysiloxane having on the average at least two alkenyl radicals in a molecule, represented by the average compositional formula (1).

$$R^1_a SiO_{(4-a)/2} \quad (1)$$

In formula (1), $R^1$ is a substituted or unsubstituted monovalent hydrocarbon radical having 1 to 10 carbon atoms, preferably 1 to 8 carbon atoms, and letter a is a positive number of 1.5 to 2.8, preferably 1.8 to 2.5, more preferably 1.95 to 2.05. The $R^1$ radicals may be the same or different. Examples of the substituted or unsubstituted monovalent hydrocarbon radical attached to a silicon atom represented by $R^1$ include alkyl radicals such as methyl, ethyl, propyl, isopropyl, butyl, isobutyl, tert-butyl, pentyl, neopentyl, hexyl, cyclohexyl, octyl, nonyl, and decyl; aryl radicals such as phenyl, tolyl, xylyl and naphthyl; aralkyl radicals such as benzyl, phenylethyl and phenylpropyl; alkenyl radicals such as vinyl, allyl, propenyl, isopropenyl, butenyl, hexenyl, cyclohexenyl and octenyl; and substituted ones of the foregoing radicals in which some or all of the hydrogen atoms are replaced by halogen atoms (e.g., fluorine, bromine and chlorine) or cyano radicals, such as chloromethyl, chloropropyl, bromoethyl, trifluoropropyl, and cyanoethyl.

At least two of the organic radicals represented by $R^1$ are alkenyl radicals, preferably having 2 to 8 carbon atoms, more preferably 2 to 6 carbon atoms. Preferably the content of alkenyl radicals is 0.005 to 10 mol %, more preferably 0.01 to 5 mol % of the entire $R^1$ radicals. It is noted that alkenyl radicals may be attached to silicon atoms at the ends of or midway of a molecular chain or both. When the curing rate of a composition and the physical properties of cured parts are taken into account, the organopolysiloxane used herein should preferably contain at least an aliphatic unsaturated bond attached to a silicon atom at the end of the molecular chain.

With respect to its molecular structure, the organopolysiloxane is preferably of a straight chain while it may partially have a branched or cyclic structure. With respect to the molecular weight, no particular limit is imposed and a choice may be made from liquid organopolysiloxanes having a low viscosity to gum-like organopolysiloxanes having a high viscosity. In order that an organopolysiloxane cure into a rubbery elastomer, it usually has a viscosity of at least 100 centipoise at 25° C., preferably 100 to 1,000,000 centipoise at 25° C., especially 500 to 100,000 centipoise at 25° C.

Component (B) is an organohydrogenpolysiloxane represented by the average compositional formula (2) and having at least two hydrogen atoms each attached to a silicon atom (i.e., at least two SiH groups).

$$R^2{}_b H_c SiO_{(4-b-c)/2} \tag{2}$$

In formula (2), $R^2$ is a substituted or unsubstituted monovalent hydrocarbon radical having 1 to 10 carbon atoms, and letter b is a positive number of 0.7 to 2.1, preferably 1.0 to 2.0, c is a positive number of 0.001 to 1.0, preferably 0.01 to 1.0, and the sum of b+c is from 0.8 to 3.0, preferably 1.0 to 2.5.

The organohydrogenpolysiloxane should have at least two, preferably 2 to 200, more preferably 3 to 50 hydrogen atoms each attached to a silicon atom (that is, SiH radicals) in a molecule. The radicals represented by $R^2$ include the same examples as mentioned for $R^1$. Those radicals free of an aliphatic unsaturated bond are preferred (that is, alkenyl groups are preferably excluded).

Exemplary organohydrogenpolysiloxanes include methylhydrogen cyclic polysiloxane, both end trimethylsiloxy-blocked methylhydrogenpolysiloxane, a both end trimethylsiloxy-blocked dimethylsiloxane-methylhydrogensiloxane copolymer, both end dimethylhydrogensiloxy-blocked dimethylpolysiloxane, a both end dimethylhydrogensiloxy-blocked dimethylsiloxane-methylhydrogensiloxane copolymer, a both end trimethylsiloxy-blocked methylhydrogensiloxane-diphenylsiloxane copolymer, a both end trimethylsiloxy-blocked methylhydrogensiloxane-diphenylsiloxane-dimethylsiloxane copolymer a copolymer of $(CH_3)_2HSiO_{1/2}$ units and $SiO_{4/2}$ units, a polymer of $(CH_3)_2HSiO_{1/2}$ units, $(CH_3)_3SiO_{1/2}$ units and $SiO_{4/2}$ units, and a polymer of $(CH_3)_2HSiO_{1/2}$ units, $SiO_{4/2}$ units, and $(C_6H_5)SiO_{3/2}$ units.

The organohydrogenpolysiloxanes may be linear, branched, cyclic or three-dimensional network structure (resinous). The number of silicon atoms in a molecule, that is, the degree of polymerization is preferably about 2 to 200, more preferably about 4 to 100.

The organohydrogenpolysiloxane (B) is blended in an amount of 0.1 to 50 parts, preferably 0.3 to 30 parts by weight per 100 parts by weight of the organopolysiloxane (A). Differently stated, the organohydrogenpolysiloxane (B) is blended in such an amount that about 0.5 to 10 mol, preferably about 0.8 to 5 mol, more preferably about 0.8 to 2.5 mol of silicon atom-attached hydrogen atoms (SiH radicals) in component (B) are available per mol of alkenyl groups in component (A).

Component (C) is a thixotropic agent which may be any of compounds capable of suppressing the flow of a silicone rubber composition and imparting thixotropy thereto. In general, the thixotropic agents in solid state at room temperature (ex. 25° C.) include fumed silica, fumed titanium oxide, and carbon. They are often fine powders having a mean particle size of about 0.005 to 200 μm, preferably about 0.01 to 100 μm (for example, as measured by laser light diffractometry) or a specific surface area of at least about 50 m²/g, preferably about 50 to 400 m²/g (for example, as measured by the BET method). They may be used as such or after surface treatment with organic silicon compounds, for example, organosilazanes, organosilanes and organosiloxanes such as hexamethylsilazane, trimethylchlorosilane and polymethylsiloxane. As to liquid thixotropic agents, which have liquid state at room temperature (e.g., 25° C.), any of thixotropic compounds which are incompatible with the inventive composition may be used. Typical examples are polyether compounds such as polyethylene oxide, polypropylene oxide, polyethylene glycol and polypropylene glycol, block polymers thereof with siloxane compounds, and copolymers of dimethylsiloxane and diphenylsiloxane. In order to fully and stably exert the thixotropic property, it is preferable to blend at least one liquid thixotropic agent, more preferably at least one liquid thixotropic agent and at least one solid thixotropic agent in combination.

The thixotropic agent (C) is blended in an amount of 0.01 to 30 parts, preferably 0.03 to 20 parts by weight per 100 parts by weight of the organopolysiloxane (A). Less than 0.01 part of the thixotropic agent fails to impart thixotropy whereas more than 30 parts of the thixotropic agent adversely affects moldability and rubber physical properties. The thixotropic agents may be used alone or in admixture of two or more.

Component (D) is an addition reaction catalyst. Included are platinum catalysts, for example, platinum black, platinic chloride, chloroplatinic acid, reaction products of chloroplatinic acid with monohydric alcohols, complexes of chloroplatinic acid with olefins, and platinum bisacetoacetate, palladium catalysts, and rhodium catalysts.

The addition reaction catalyst (D) is used in a catalytic amount, typically about 1 to 1,000 parts, preferably about 5 to 200 parts by weight of platinum per million parts by weight of components (A) and (B) combined.

Component (E) is a hollow filler (i.e., micro balloon) which is effective for reducing the weight of a cured part by introducing gaseous cells therein as in sponge rubber. Such fillers are glass balloons, silica balloons, carbon balloons, phenol resin balloons, vinylidene chloride resin balloons, resin balloons composed of a vinylidene chloride-(meth) acrylonitrile copolymer, alumina balloons, zirconia balloons, and shirasu (white sand) balloons. An inorganic filler may be bonded to the surface of the hollow filler for the purpose of providing the hollow filler with strength. For weight reduction of the silicone rubber composition, the hollow filler should have a true specific gravity of 0.01 to 0.40, preferably 0.02 to 0.30. A hollow filler with a specific gravity of less than 0.01 is difficult to blend and handle and has an insufficient pressure resistance so that it may be crushed during injection molding, failing in m weight reduction. Also, the hollow filler should have a mean particle size of up to 300 μm, typically about 1 to 300 μm, preferably about 5 to 200 μm, more preferably about 10 to 100 μm. A hollow filler with a mean particle size of more than 300 μm can be crushed by the pressure during injection molding, failing in weight reduction.

The hollow filler (E) is blended in an amount of 0.5 to 30 parts, preferably 1.0 to 20 parts by weight per 100 parts by weight of the organopolysiloxane (A). Less than 0.5 part of the hollow filler is too small to achieve sufficient weight reduction whereas more than 30 parts of the hollow filler is difficult to blend and adversely affect rubber strength. In this case, the hollow filler (E) should preferably be contained in an amount of 10 to 80% by volume, especially 15 to 75% by volume in the hollow filler-containing silicone rubber composition.

In addition to the essential components (A) to (E) mentioned above, another filler may be blended for the purpose of improving the mechanical strength of molded parts, improving heat resistance or improving flame retardance, as long as the benefits of the invention are not impaired. Such additional fillers are typically non-reinforcing fillers including precipitated silica, ground quartz, asbestos, aluminosilicate, iron oxide, zinc oxide, calcium carbonate, magnesium carbonate, and cerium oxide. They may be used as such or after surface treatment with organic silicon compounds such as hexamethylsilazane, trimethylchlorosilane and polymethylsiloxane.

The silicone rubber composition of the invention comprising the above-defined components (A) to (E) as essential components should be thixotropic. As a measure of thixotropy, the silicone rubber composition should preferably show a sag of up to 1.2 inches, that is, 0 to 1.2 inches, more preferably 0 to 1 inch, after 1 minute as measured by the Boeing flow jig test (defined below). With a sag of more than 1.2 inches, the composition tends to allow the hollow filler to float and separate with the lapse of time, resulting in a series of cured parts varying in specific gravity.

Boeing Flow Jig Test

This test is to determined the extent of restraining a test composition from sagging. A composition is placed in a bowl of a Boeing flow jig, and a horizontal test jig is placed upright with one end down so that the composition flows vertically downward from the bowl on the scale. The amount of the composition that flows downward under gravity is measured after 60 seconds as the distance (inch) of the flow. Although measurement is normally made after 35 seconds, measurement is herein made after 60 seconds in order to provide a definite difference among the relevant compositions.

Additionally, the composition of the invention should preferably have a viscosity in a specific range. When measured for viscosity by a rotation viscometer, the silicone rubber composition of the invention should preferably have a viscosity of at least 500 poises as measured by a BH type viscometer with No. 7 rotor at 20 rpm and a viscosity of up to 24,000 poises as measured by a BS type viscometer with No. 7 rotor at 5 rpm. More preferably, the composition has a viscosity of at least 800 poises as measured by a BH type viscometer with No. 7 rotor at 20 rpm and a viscosity of up to 20,000 poises as measured by a BS type viscometer with No. 7 rotor at 5 rpm. With a viscosity of less than 500 poises, the composition would allow separation of the hollow filler. A composition with a viscosity of more than 24,000 poises would be difficult to prepare and allow the hollow filler to be crushed under injection molding pressure.

There has been described an injection molding silicone rubber composition loaded with a hollow filler which remains thixotropic and stable while preventing floating and separation of the hollow filler.

EXAMPLE

Examples of the invention are given below by way of illustration and not by way of limitation. All parts are by weight. Me is methyl ($CH_3$).

Example 1

A planetary mixer was charged with 100 parts of a dimethylpolysiloxane blocked with a vinyl radical at each end of its molecular chain and having a viscosity of 5,000 centistokes at 25° C., 20 parts of a dimethylpolysiloxane containing vinyl radicals on side chains (vinyl equivalent 0.0007 mol/g) and having a viscosity of 5,000 centistokes at 25° C., 8 parts of hydrophobicized fumed silica having a specific surface area of 110 $m^2/g$ (R-972 by Nippon Aerosil K.K.) as a thixotropic agent, and 4 parts of a hollow filler made of a copolymeric resin primarily of vinylidene chloride and acrylonitrile and having a specific gravity of 0.04 and a mean particle size of 40 μm (Expancel DE by Expancel Corp.). The mixer was operated for 30 minutes for admixing the ingredients. Further, 5.7 parts of methylhydrogenpolysiloxane of the following formula (a), 0.05 part of ethynyl cyclohexanol as a reaction controlling agent, and 1 part of polyethylene glycol as a liquid thixotropic agent were added to the mixer where agitation was continued for a further 15 minutes, obtaining a silicone rubber composition (1). The hollow filler was contained in an amount of 43% by volume in the composition. This composition was measured for viscosity and thixotropy, finding a viscosity of 3,600 poises and 4,200 poises as measured by the BS type viscometer with No. 7 rotor at 10 rpm and 5 rpm, respectively, and a thixotropy or sag of 0.65 inch as measured by the Boeing flow jig test.

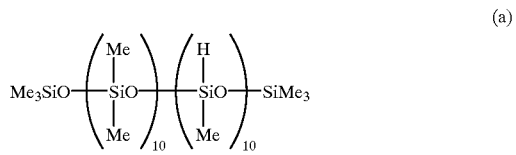

(a)

To 132 parts of Composition (1) was added 0.1 part of a 1% isopropyl alcohol solution of chloroplatinic acid. The mixture was agitated, deaerated, formed into a sheet of 2 mm thick, and cured in an oven at 150° C. for 15 minutes. After cooling, the cured sheet was found to have a specific gravity of 0.55.

Separately, a metallic cylindrical can of 110 mm in diameter and 140 mm high was filled with 500 g of Composition (1). After the can was allowed to stand for one week at 25° C., a 132 g portion was taken out from the top of the composition. The 1% isopropyl alcohol solution of chloroplatinic acid, 0.1 g, was added thereto. The mixture was agitated, deaerated, formed into a sheet of 2 mm thick, and cured in an oven at 150° C. for 15 minutes. After cooling, the cured sheet was found to have a specific gravity of 0.54.

Example 2

A planetary mixer was charged with 100 parts of a dimethylpolysiloxane blocked with a vinyl radical at each end of its molecular chain and having a viscosity of 5,000 centistokes at 25° C., 20 parts of a dimethylpolysiloxane containing vinyl radicals on side chains (vinyl equivalent 0.0007 mol/g) and having a viscosity of 5,000 centistokes at 25° C., 5 parts of fumed silica having a specific surface area of 200 $m^2/g$ (Aerosil 200 by Nippon Aerosil K.K.) as a thixotropic agent, and 2 parts of the hollow filler having a specific gravity of 0.04 and a mean particle size of 40 μm (Expancel DE by Expancel Corp.) as used in Example 1. The mixer was operated for 30 minutes for admixing the ingredients. Further, 5.7 parts of methylhydrogenpolysiloxane of formula (a), 0.05 part of ethynyl cyclohexanol as a reaction controlling agent, and 3 parts of a dimethylsiloxane-diphenylsiloxane copolymer of the following formula (b) as a liquid thixotropic agent were added to the mixer where agitation was continued for a further 15 minutes, obtaining a silicone rubber composition (2). The hollow filler was contained in an amount of 28% by volume in the composition. This composition was measured for viscosity and thixotropy, finding a viscosity of 2,100 poises and 1,700 poises as measured by the BH type viscometer with No. 7 rotor at 10 rpm and 20 rpm, respectively, and a thixotropy or sag of 0.81 inch.

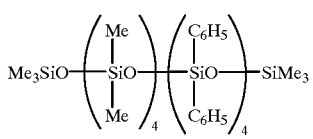

(b)

As in Example 1, cured sheets were obtained from a fresh sample and a 1-week aged sample and measured for specific gravity, finding a specific gravity of 0.67 for the fresh sample and 0.66 for the aged sample.

Example 3

A planetary mixer was charged with 100 parts of a dimethylpolysiloxane blocked with a vinyl radical at each end of its molecular chain and having a viscosity of 5,000 centistokes at 25° C., 20 parts of a dimethylpolysiloxane containing vinyl radicals on side chains (vinyl equivalent 0.0007 mol/g) and having a viscosity of 5,000 centistokes at 25° C., 7 parts of hydrophobicized fumed silica having a specific surface area of 110 m$^2$/g (Aerosil 200 by Nippon Aerosil K.K.) as a thixotropic agent, and 12 parts of a hollow filler composed mainly of a polyacrylonitrile resin, surface coated with calcium carbonate, and having a specific gravity of 0.13 and a mean particle size of 100 μm (Microsphere MFL-100CA by Matsumoto Yushi K.K.). The mixer was operated for 30 minutes for admixing the ingredients. Further, 5.7 parts of methylhydrogenpolysiloxane of formula (a), 0.05 part of ethynyl cyclohexanol as a reaction controlling agent, and 1 part of polyethylene glycol as a liquid thixotropic agent were added to the mixer where agitation was continued for a further 15 minutes, obtaining a silicone rubber composition (3). The hollow filler was contained in an amount of 42% by volume in the composition. This composition was measured for viscosity and thixotropy, finding a viscosity of 3,200 poises as measured by the BH type viscometer with No. 7 rotor at 10 rpm and 3,500 poises as measured by the BS type viscometer with No. 7 rotor at 5 rpm, and a thixotropy or sag of 0.75 inch.

As in Example 1, cured sheets were obtained from a fresh sample and a 1-week aged sample and measured for specific gravity, finding a specific gravity of 0.58 for the fresh sample and 0.55 for the aged sample.

Comparative Example 1

A planetary mixer was charged with 100 parts of a dimethylpolysiloxane blocked with a vinyl radical at each end of its molecular chain and having a viscosity of 5,000 centistokes at 25° C., 20 parts of a dimethylpolysiloxane containing vinyl radicals on side chains (vinyl equivalent 0.0007 mol/g) and having a viscosity of 5,000 centistokes at 25° C., and 4 parts of the hollow filler having a specific gravity of 0.04 and a mean particle size of 40 μm (Expancel DE by Expancel Corp.) as used in Example 1. The mixer was operated for 30 minutes for admixing the ingredients. Further, 5.7 parts of methylhydrogenpolysiloxane of formula (a) and 0.05 part of ethynyl cyclohexanol as a reaction controlling agent were added to the mixer where agitation was continued for a further 15 minutes, obtaining a silicone rubber composition (4). The hollow filler was contained in an amount of 44% by volume in the composition. This composition was measured for viscosity and thixotropy, finding a viscosity of 1,900 poises and 1,600 poises as measured by the BH type viscometer with No. 7 rotor at 10 rpm and 20 rpm, respectively, and a thixotropy or sag of 1.48 inches.

As in Example 1, cured sheets were obtained from a fresh sample and a 1-week aged sample and measured for specific gravity, finding a specific gravity of 0.51 for the fresh sample and 0.29 for the aged sample.

Comparative Example 2

A planetary mixer was charged with 100 parts of a dimethylpolysiloxane blocked with a vinyl radical at each end of its molecular chain and having a viscosity of 5,000 centistokes at 25° C., 20 parts of a dimethylpolysiloxane containing vinyl radicals on side chains (vinyl equivalent 0.0007 mol/g) and having a viscosity of 5,000 centistokes at 25° C., and 12 parts of the hollow filler surface coated with calcium carbonate and having a specific gravity of 0.13 and a mean particle size of 100 μm (Microsphere MFL-100CA by Matsumoto Yushi K.K.) as used in Example 3. The mixer was operated for 30 minutes for admixing the ingredients. Further, 5.7 parts of methylhydrogenpolysiloxane of formula (a) and 0.05 part of ethynyl cyclohexanol as a reaction controlling agent were added to the mixer where agitation was continued for a further 15 minutes, obtaining a silicone rubber composition (5). The hollow filler was contained in an amount of 42% by volume in the composition. This composition was measured for viscosity and thixotropy, finding a viscosity of 900 poises and 1,000 poises as measured by the BH type viscometer with No. 7 rotor at 20 rpm and 10 rpm, respectively, and a thixotropy or sag of 1.72 inches.

As in Example 1, cured sheets were obtained from a fresh sample and a 1-week aged sample and measured for specific gravity, finding a specific gravity of 0.65 for the fresh sample and 0.41 for the aged sample.

Example 4

To each 50 parts of addition curing type liquid silicone rubber compound KE1218 Part A (base) and Part B (curing agent) by Shin-Etsu Chemical Industry Co., Ltd. were added 7 parts of hydrophobicized fumed silica having a specific surface area of 110 m$^2$/g (Aerosil 200 by Nippon Aerosil K.K.) as a thixotropic agent, 3.5 parts of the hollow filler having a specific gravity of 0.04 and a mean particle size of 40 μm (Expancel DE by Expancel Corp.) as used in Example 1, and 1 part of polyethylene glycol as a liquid thixotropic agent. Agitation was carried out for 15 minutes, obtaining a silicone rubber composition (6). The hollow filler was contained in an amount of 53% by volume in the composition. This composition was measured for viscosity and thixotropy, finding a viscosity of 1,500 poises and 1,800 poises as measured by the BH type viscometer with No. 7 rotor at 20 rpm and 10 rpm, respectively, and a thixotropy or sag of 0.83 inches.

As in Example 1, cured sheets were obtained from a fresh sample (immediately after mixing) and an aged sample (aged for one week at 25° C. in a metallic can) and measured for specific gravity, finding a specific gravity of 0.63 for the fresh sample and 0.61 for the aged sample.

Comparative Example 3

To each 50 parts of addition curing type liquid silicone rubber compound KE1218 Part A (base) and Part B (curing agent) by Shin-Etsu Chemical Industry Co., Ltd. was added 3.5 parts of the hollow filler having a specific gravity of 0.04 and a mean particle size of 40 μm (Expancel DE by Expancel Corp.) as used in Example 1. They were agitated for 15 minutes, obtaining a silicone rubber composition (7). The hollow filler was contained in an amount of 55% by volume in the composition. This composition was measured for viscosity and thixotropy, finding a viscosity of 800 poises and 900 poises as measured by the BH type viscometer with No. 7 rotor at 20 rpm and 10 rpm, respectively, and a thixotropy or sag of 1.96 inches.

As in Example 1, cured sheets were obtained from a fresh sample (immediately after mixing) and an aged sample (aged for one week at 25° C. in a metallic can) and measured for specific gravity, finding a specific gravity of 0.58 for the fresh sample and 0.34 for the aged sample.

Example 5

A planetary mixer was charged with 100 parts of a dimethylpolysiloxane blocked with a vinyl radical at each end of its molecular chain and having a viscosity of 5,000 centistokes at 25° C. 20 parts of a dimethylpolysiloxane containing vinyl radicals on side chains (vinyl equivalent 0.0007 mol/g) and having a viscosity of 5,000 centistokes at 25° C., 7 parts of hydrophobicized fumed silica having a specific surface area of 110 m²/g (R-972 by Nippon Aerosil K.K.) as a thixotropic agent, and 30 parts of a hollow glass filler (i.e., glass balloon) having a specific gravity of 0.30 and a mean particle size of 60 μm (Celstar by Tokai Industry K.K.). The mixer was operated for 30 minutes for admixing the ingredients. Further, 5.7 parts of methylhydrogenpolysiloxane of formula (a), 0.05 part of ethynyl cyclohexanol as a reaction controlling agent, and 1 part of polyethylene glycol as a liquid thixotropic agent were added to the mixer where agitation was continued for a further 15 minutes, obtaining a silicone rubber composition (8). The hollow filler was contained in an amount of 44% by volume in the composition. This composition was measured for viscosity and thixotropy, finding a viscosity of 4,500 poises as measured by the BH type viscometer with No. 7 rotor at 10 rpm and a thixotropy or sag of 0.52 inch.

As in Example 1, cured sheets were obtained from a fresh sample and a 1-week aged sample and measured for specific gravity, finding a specific gravity of 0.79 for the fresh sample and 0.77 for the aged sample.

Japanese Patent Application No. 332503/1997 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

We claim:

1. A thixotropic silicone rubber composition for injection molding comprising
   (A) 100 parts by weight of an organopolysiloxane having on the average at least two alkenyl radicals in a molecule, represented by the following average compositional formula (1):

$$R^1{}_a SiO_{(4-a)/2} \tag{1}$$

wherein $R^1$ is a substituted or unsubstituted monovalent hydrocarbon radical having 1 to 10 carbon atoms, and letter a is a positive number of 1.5 to 2.8,
   (B) 0.1 to 50 parts by weight of an organohydrogenpolysiloxane represented by the following average compositional formula (2) and having at least two hydrogen atoms each attached to a silicon atom:

$$R^2{}_b H_c SiO_{(4-b-c)/2} \tag{2}$$

wherein $R^2$ is a substituted or unsubstituted monovalent hydrocarbon radical having 1 to 10 carbon atoms, and letter b is a positive number of 0.7 to 2.1, c is a positive number of 0.001 to 1.0, and the sum of b+c is from 0.8 to 3.0,
   (C) 0.01 to 30 parts by weight of a thixotropic agent which is a blend of at least one liquid thixotropic agent and at least one solid thixotropic agent,
   (D) a catalytic amount of an addition reaction catalyst, and
   (E) 0.5 to 30 parts by weight of a fine hollow filler having a specific gravity of 0.01 to 0.40 and a mean particle size of up to 300 μm.

2. The silicone rubber composition of claim 1 which has a viscosity of at least 500 poises as measured by a BH rotation viscometer with No. 7 rotor at 20 rpm and a viscosity of up to 24,000 poises as measured by a BS rotation viscometer with No. 7 rotor at 5 rpm.

3. The silicone rubber composition of claim 1 which has a thixotropy corresponding to a sag of up to 1.2 inches after 1 minute as measured by the Boeing flow jig test.

4. A thixotropic silicone rubber composition for injection molding comprising:
   (A) 100 parts by weight of an organopolysiloxane having on the average at least two alkenyl radicals in a molecule, represented by the following average compositional formula (1):

$$R^1{}_a SiO_{(4-a)/2} \tag{1}$$

wherein $R^1$ is a substituted or unsubstituted monovalent hydrocarbon radical having 1 to 10 carbon atoms, and letter a is a positive number of 1.5 to 2.8,
   (B) 0.1 to 50 parts by weight of an organohydrogenpolysiloxane represented by the following average compositional formula (2) and having at least two hydrogen atoms each attached to a silicon atom:

$$R^2{}_b H_c SiO_{(4-b-c)/2} \tag{2}$$

wherein $R^2$ is a substituted or unsubstituted monovalent hydrocarbon radical having 1 to 10 carbon atoms, and letter b is a positive number of 0.7 to 2.1, c is a positive number of 0.001 to 1.0, and the sum of b+c is from 0.8 to 3.0,
   (C) 0.01 to 30 parts by weight of a thixotropic agent, which is a blend of at least one liquid thixotropic agent and at least one solid thixotropic agent,
   (D) a catalytic amount of an addition reaction catalyst, and
   (E) 0.5 to 30 parts by weight of a fine hollow filler having a specific gravity of 0.01 to 0.40 and a mean particle size of up to 300 μm,
   said silicone rubber composition having a viscosity of at least 1,500 poise as measured by a BS rotation viscometer with No. 7 rotor at 20 rpm and a viscosity of up to 24,000 poise as measured by a BS rotation viscometer with No. 7 rotor at 5 rpm.

5. The silicone rubber composition of claim 4, which has a thixotropy corresponding to a sag of up to 1.2 inches after 1 minute as measure by the Boeing flow jig test.

6. The silicone rubber composition of claim 4, wherein said thixotropic agent is a blend of at least one liquid thixotropic agent and at least one solid thixotropic agent.

7. The silicone rubber composition of claim 1, wherein said liquid thixotropic agent is a polyether compound, block polymer thereof with a siloxane compound or a copolymer of dimethylsiloxane and diphenylsiloxane.

8. The silicone rubber composition of claim 7, wherein said solid thixotropic agent is a fumed silica, fumed titanium oxide or carbon, each having a mean particle size of 0.005 to 200 μm.

9. The silicone rubber composition of claim 6, wherein said liquid thixotropic agent is a polyether compound, block polymer thereof with a siloxane compound or a copolymer of dimethylsiloxane and diphenylsiloxane.

10. The silicone rubber composition of claim 1, wherein $R^1$ and $R^2$ are each independently alkyl, alkenyl, aryl or aralkyl, each optionally substituted by halogen, cyano or cyanoethyl.

11. The silicone rubber composition of claim 10, wherein $R^1$ and $R^2$ are each independently methyl, ethyl, propyl, isopropyl, butyl, isobutyl, tert-butyl, pentyl, neopentyl, hexyl, cyclohexyl, octyl, nonyl, decyl, phenyl, tolyl, xylyl, naphthyl, benzyl, phenyethyl, phenylpropyl, vinyl, allyl, propenyl, isopropenyl, butenyl, hexenyl, cyclohexenyl, or octenyl.

12. The silicone rubber composition of claim 10, wherein $R^2$ is vinyl, allyl, propenyl, isopropenyl, butenyl, hexenyl, cyclohexenyl, or octenyl.

13. The silicone rubber composition of claim 11, wherein $R^2$ is vinyl, allyl, propenyl, isopropenyl, butenyl, hexenyl, cyclohexenyl, or octenyl.

14. The silicone rubber composition of claim 10, wherein at least two $R^1$ are alkenyl.

15. The silicone rubber composition of claim 1, wherein 0.005 to 10 mol % of $R^1$, based on all $R^1$, are alkenyl.

16. The silicone rubber composition of claim 1, wherein the organohydrogenpolysiloxane is methylhydrogen cyclic polysiloxane, both end trimethyl-siloxy-blocked methylhydrogenpolysiloxane, a both end trimethjylsiloxy-blocked dimethylsiloxanemethylhydrogen-siloxane copolymer, both end dimethylhydrogensiloxy-blocked dimethylpolysiloxane, a both end demethylhydrogensiloxy-blocked dimethylsiloxanemethylhydrogen siloxane copolymer, a both end trimethylsiloxy-blocked methylhydrogensiloxane-diphenylsiloxane copolymer, a copolymer of $(CH_3)_2HSiO_{1/2}$ units and $SiO_{4/2}$ units, a polymer of $(CH_3)_2HSiO_{1/2}$ units, $(CH_3)_3SiO_{1/2}$ units and $SiO_{4/2}$ units, or a polymer of $(CH_3)_2HSiO_{1/2}$ units, $SiO_{4/2}$ units, and $(C_6H_5)_2HSiO_{3/2}$.

17. The silicone rubber composition of claim 1, wherein (E) is a glass balloon, a silica balloon, a carbon balloon, a phenol resin balloon, a vinylidene chloride resin balloon, a resin balloon composed of a vinylidene chloride(meth) acrylonitrile copolymer, an alumina balloon, a zirconia balloon, or a white sand balloon.

* * * * *